United States Patent [19]

Moren et al.

[11] Patent Number: 4,990,843
[45] Date of Patent: Feb. 5, 1991

[54] RELUCTANCE MOTOR

[75] Inventors: Lars G. Moren, Huddinge; Bengt G. Hedlund, Stockholm, both of Sweden

[73] Assignee: Electrolux Mecatronik Aktiebolag, Malmo, Sweden

[21] Appl. No.: 465,145

[22] PCT Filed: Jun. 20, 1989

[86] PCT No.: PCT/SE89/00355

§ 371 Date: Feb. 21, 1990

§ 102(e) Date: Feb. 21, 1990

[87] PCT Pub. No.: WO90/00325

PCT Pub. Date: Jan. 11, 1990

[30] Foreign Application Priority Data

Jun. 27, 1988 [SE] Sweden ................................ 8802394

[51] Int. Cl.$^5$ .............................................. H02P 6/02
[52] U.S. Cl. ..................................... 318/701; 318/254
[58] Field of Search ................ 318/138, 254, 430, 431, 318/439, 701

[56] References Cited

U.S. PATENT DOCUMENTS

| | | | |
|---|---|---|---|
| 4,616,165 | 10/1986 | Compter | 318/701 |
| 4,631,459 | 12/1986 | Fujioka et al. | 318/254 |
| 4,748,387 | 5/1988 | Tanuma et al. | 318/138 X |
| 4,777,419 | 10/1988 | Obradovic | 318/254 X |
| 4,814,676 | 3/1989 | Van Hout | 318/138 X |
| 4,835,448 | 5/1989 | Dishner et al. | 318/138 X |
| 4,882,523 | 11/1989 | Denzlingen | 318/254 |

*Primary Examiner*—Bentsu Ro
*Attorney, Agent, or Firm*—Pearne, Gordon, McCoy & Granger

[57] ABSTRACT

A reluctance motor comprises a stator (11) with poles (1,1', 2,2', 3,3') which are cooperating in pairs, and a rotor (12) made from soft magnetic material and having poles (13) which are disposed diametrically opposite each other in pairs. The stator poles have magnetizing windings (14,15) which for each pair of stator poles are connectable to a DC source (18) under the control of a control device (26) in dependence on a signal from a sensor device (20) which is arranged during the movement of the rotor (12) to indicate the position of the rotor poles (13). The sensor device comprises a sensor (21) which cooperates with a disc (23) rotating with the rotor (12) and having wings (22), the number of which corresponds to the number of stator poles or to the said number multiplied by two. At the start of the motor, the control device (26) is arranged to connect in proper order a predetermined pair (1,1') of stator poles to the DC source (18) and then the next pair of poles (2,2') in the desired direction of rotation and thereafter the next following pair (3,3') of poles in the same direction, etc.

3 Claims, 3 Drawing Sheets

RELUCTANCE MOTOR

BACKGROUND OF THE INVENTION

In reluctance motors it is common to provide stator poles which are cooperating in pairs and which are equally disposed along the way of movement of the rotor poles. Like the stator, the rotor has a shape such that its poles are cooperating in pairs. Hence, during the turning of the rotor, the two poles of a stator pole pair simultaneously cooperate with the corresponding poles of a rotor pole pair. In operation, the stator pole pairs are connected to a source of DC voltage in proper order and, in principle, a selected stator pole pair is connected to the DC voltage upon a rotor pole being about to turn over the stator pole. The voltage remains until the rotor pole has been fully turned over the stator pole. For the control of the motor speed the moments of connecting and disconnecting, respectively, of the supply voltage can be varied.

Detailed information about reluctance motors of the kind indicated has been published under the heading "Variable-speed Switched Reluctance Motors" in IEE PROC., Vol. 127, Pt. B, No. 4, July 1980.

The moments of connection and disconnection of the stator pole pairs are controlled by sensors indicating those positions in which a rotor pole begins to overlap a stator pole. In order for the rotor at start to turn in the desired direction, up to now one sensor has been required for each stator pole pair.

SUMMARY OF THE INVENTION

The object of the invention is to simplify a reluctance motor of the kind indicated so that irrespective of the number of poles only one sensor be required for start of the motor in the desired one of the two possible directions of rotation. The object will be achieved in a motor having the features indicated in the appending claims.

BRIEF DESCRIPTION OF THE DRAWINGS

A reluctance motor according to the invention will now be described in detail with reference to the enclosed drawings.

Finally.

DETAILED DESCRIPTION OF THE PREFERRED EMBODIMENTS

Figure 1:
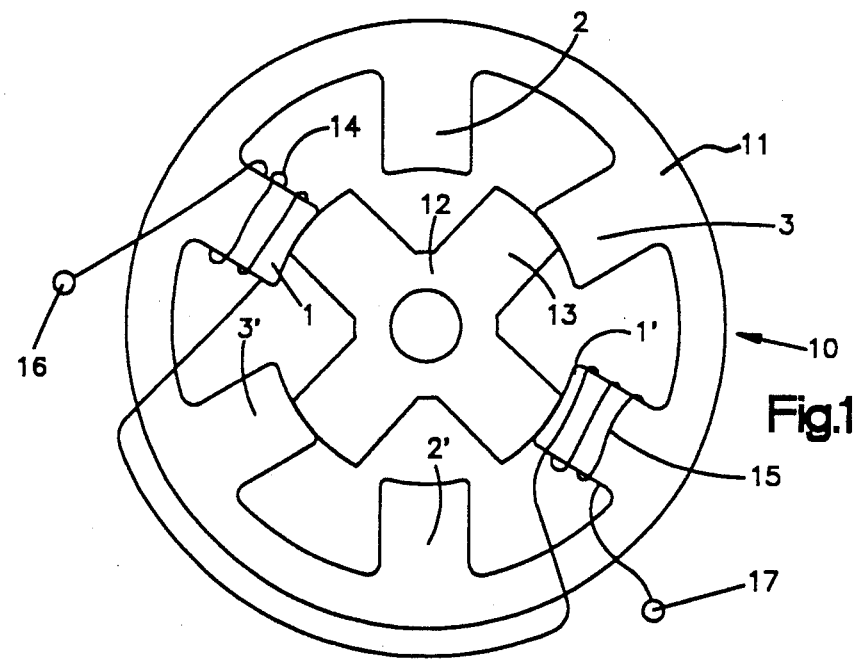
FIG. 1 schematically shows the construction of a reluctance motor having six stator poles and four rotor poles.

In the paper referred to above, formulas have been given for the calculation of optimum combinations of pole numbers of the stator and the rotor. The embodiment chosen is one such optimum combination wherein a reluctance motor 10, which is schematically shown in FIG. 1, comprises a stator 11 having six poles and a rotor 12 having four poles. The stator poles are disposed so as to form pairs of poles in each of which the poles are diametrically opposite each other and three pole pairs 1,1': 2,2'; 3,3' are evenly distributed along the way of movement of the rotor poles generally designated 13. The pole surface of each stator pole has an extension along the way of movement of the rotor poles which equals the pole gap between two stator poles. The four rotor poles 13 are situated so as to form a cross and the pole surfaces have an extension along the way of movement of the rotor causing a rotor pole which is, just in front of a stator pole to completely match the stator pole.

Figure 9:
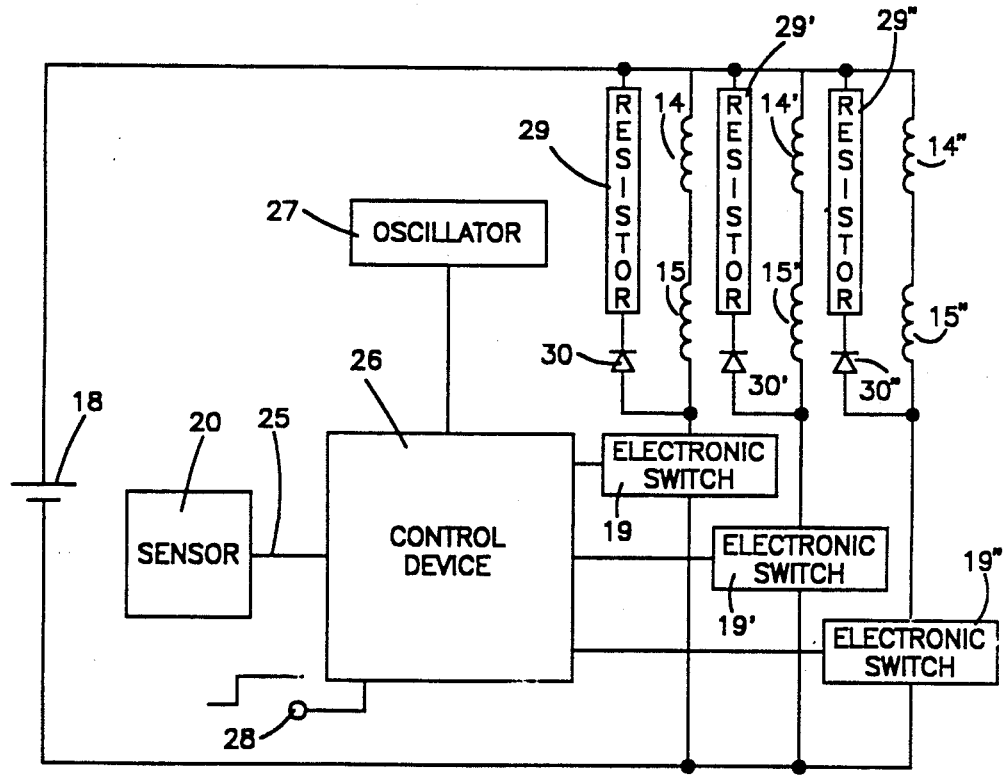
FIG. 9 is a block diagram of a control device for a reluctance motor of the invention.

The rotor is made from soft magnetic material and the stator poles are magnetized by means of windings 14,15 which via terminals 16,17, schematically indicated, connect the poles of a pole pair in series to a DC source such that the poles cooperate to drive the motor in the direction chosen. Between the DC source, designated 18 in FIG. 9, and the respective pair 14,15 of stator windings, an electronic switch 19 is connected which controls the connection and disconnection of the stator windings to the DC source. In FIG. 1 only the poles of one of the three stator pole pairs have been provided with windings 14,15 but the remaining pole pairs are correspondingly equipped. In FIG. 9 the windings of the respective pair of windings have been designated 14,15; 14', 15' and 14'', 15''. Correspondingly, the electronic switches have received the reference numerals 19,19' and 19'', To make possible at the opening of the switches 19,19',19'' the handling of the energy magnetically stored in the windings, each pair of windings is bridged by a diode in series with a resistor. The resistors have been designated 29,29', 29'' while the resistors have the reference numerals 30, 30', 30''. Below, the three pole pairs 1,1'; 2,2' and 3,3' will represent three phases analogous to what is common in connection with AC motors. However, it should be pointed out that the three phases do not relate to the voltage phases in three-phase operation. Instead, the motor is driven by DC voltage supplied to the windings during predetermined periods of time and the motor can be referred to as pulse operated.

In order for the reluctance motor to work, in principle it is required that the windings in a selected stator pole pair be connected to the voltage source 18 at the moment a rotor pole pair is about to turn over the stator poles. Disconnection takes place when the rotor poles completely match with the stator poles. At this latter moment, for the continued turning of the rotor, the windings of the next following stator pole pair, as seen in the direction of rotation, are to be connected to the voltage source. For the control of the motor, obviously, a sensor device must be provided to indicate the position of the rotor poles with respect to the stator poles. This sensor device is shown schematically in FIG. 9 and has the reference numeral 20. As appears in FIG. 2, the sensor device comprises a Hall sensor 21 which cooperates with a disc 23 having six wings 22 and fixed on a shaft 24 which also carries the rotor 12. A Hall type sensor is particularly suitable in the present case where it is desired that the indication continue during the whole period of time in which at least part of a rotor pole overlaps a stator pole. However, other kinds of sensors can be used, for example optical sensors. Via a line 25 the Hall sensor is connected to a control device 26 (FIG. 9) intended for the control of the electronic switches 19.

Figure 7:
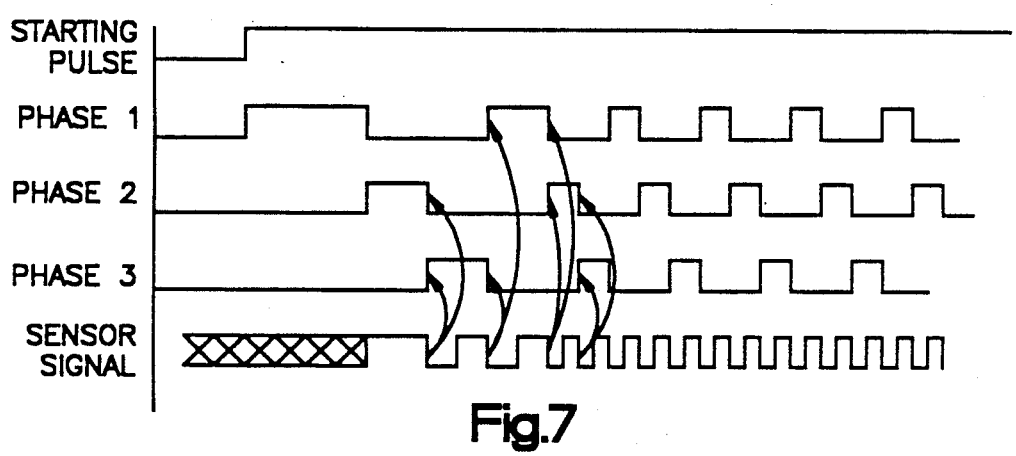
FIGS. 7 and 8 are diagrams of sensor signal waveforms relating to the single sensor embodiments of FIG. 4 and FIG. 5, respectively.
Figure 8:
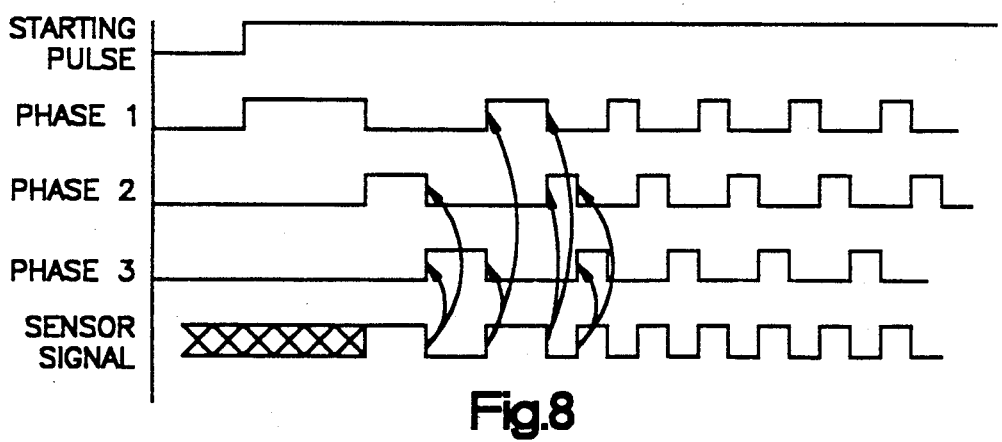

The control device 26 (FIG. 9) can be constructed in different ways and in the example a microprocessor has been chosen which controls the switches 19 depending upon signals from the sensor device 20. However, the control device may just as well be made with the use of TTL logics. The technique for this as well as for microprocessors is commonly known and will not be discussed in detail. However, it will be mentioned that the microprocessor is usually time-controlled by an oscillator 27 and, in addition, the microprocessor has an input 28 on which a starting pulse can be applied, as shown in FIGS. 6–8.

Figure 2:
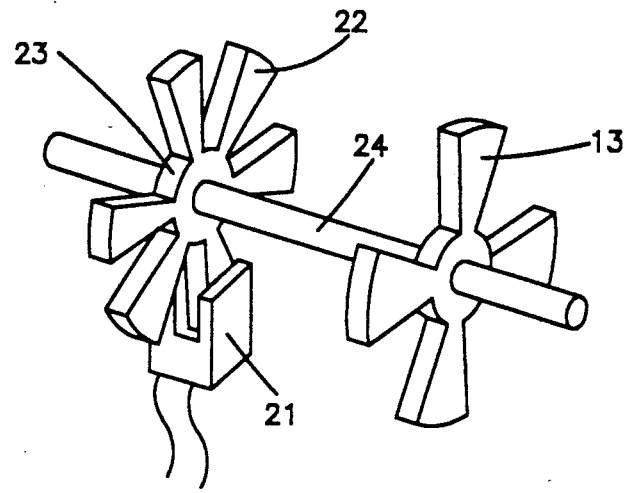
FIG. 2 shows in perspective the rotor shaft of the motor of FIG. 1 completed by a sensor device.
Figure 3:
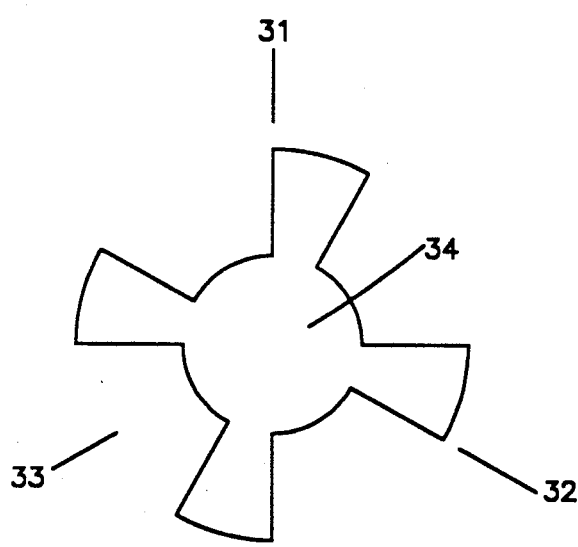
FIG. 3 shows the three-sensor positions prior art arrangement.

In starting a reluctance motor of FIG. 1 information is needed as to the rotational position of the rotor. It is known to provide the disc on the rotor shaft with four wings corresponding to the number of rotor poles and, in addition, to provide three sensors which are disposed 120° with respect to one another. In this way, by study of the signals from the three sensors it will be possible to determine which one of the three stator pole pairs is to be magnetized first in order for the rotor to start rotating in the desired direction. The four-wing disc is shown in FIG. 3 and has the reference numeral 34. Sensors, for example of the kind shown in FIG. 2, are situated in positions indicated by the reference numerals 31, 32, and 33.

Figure 6:
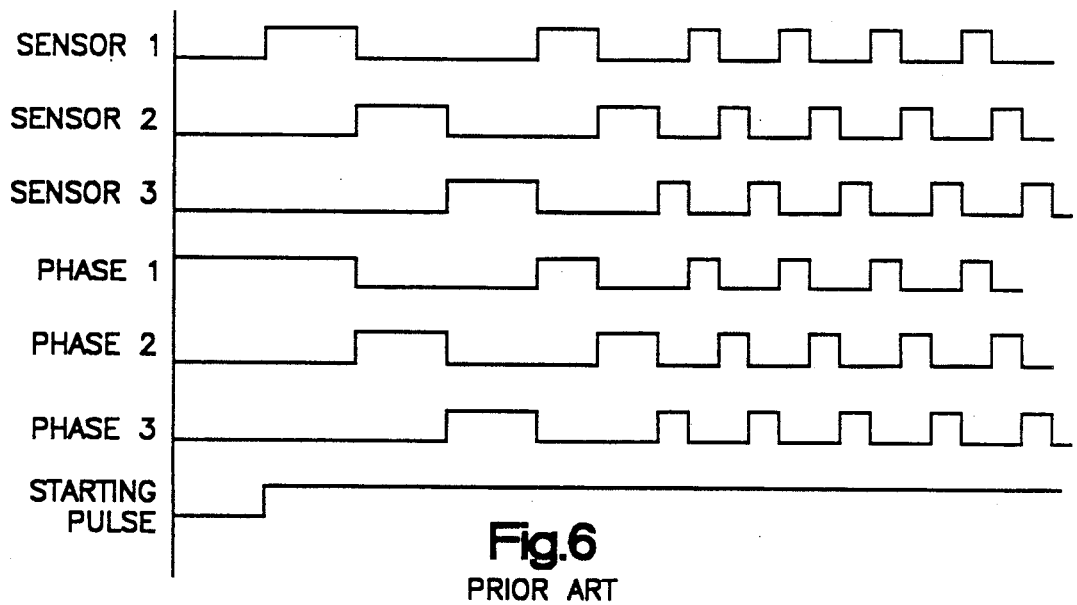
FIG. 6 is a diagram of sensor signal waveforms of a motor constructed in accordance with FIG. 1 and including three sensors according to prior art.

The function of a reluctance motor having three sensors will be best understood by study of FIG. 6 which shows the waveforms of actual stator voltages and sensor signals. The stator voltages have been designated "sensor 1", "sensor 2", and "sensor 3", corresponding respectively to the sensor positions 31, 32, and 33 indicated in FIG. 3. The sensor 1 refers to phase 1, the sensor 2 refers to phase 2 and the sensor 3 refers to phase 3. In addition, a starting pulse has been indicated having the shape of a ramp. When the starting pulse is applied, the microprocessor 26 determines which one of the sensor signals is positive, corresponding to the stator and rotor in the corresponding phase matching each other in a position creating a positive torque in the direction of rotation chosen. In the example, the sensor 1 has a positive signal which causes the switch 19 of phase 1 to be activated to connect the stator windings of phase 1 to the voltage source. Upon the signal of sensor 1 changing level the switch of phase 1 will be inactivated. As appears from the diagram, at that moment the sensor signal 2 will be positive and phase 2 will be connected. This phase is connected until the sensor signal goes low. At that moment the sensor signal 3 will take a positive value connecting phase 3, which thereafter will be followed by phase 1, etc. The diagrams of FIGS. 6 and 7 are both time diagrams, which means that at start of the motor the pulses are long, while at full speed the pulses stabilize at a shorter value.

Figure 4:
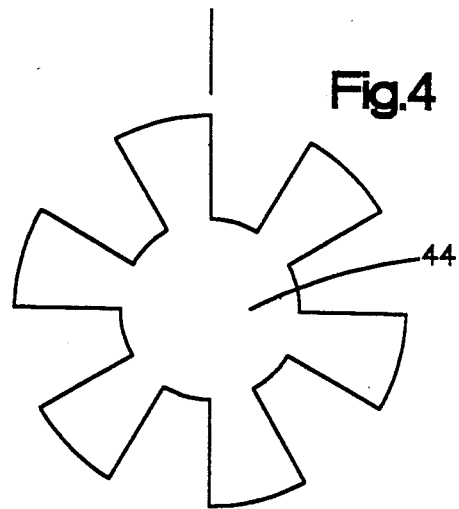
FIGS. 4 and 5 show two different sensor discs to be used in a single sensor arrangement according to the invention.

The simplified sensor device according to the invention, which includes only one sensor disposed in the position corresponding to the position 31 in FIG. 3, will now be described. Here, the sensor is of the same type as described above; however, the rotating discs have six and twelve wings, respectively. In FIG. 4 there is shown a disc 44 having six wings and in FIG. 5 a disc 54 is shown having 3 twelve wings. For both embodiments the wings have the shape of a sector of a circle, the peripheral extension of which coincides with the corresponding extension of the gap between two wings. The advantage with the twelve-wing disc is that it makes possible the use of simplified logic in the control device 26.

In FIG. 7 the waveforms have been traced for, as counted from above, the starting signal, the stator voltages of phase 1, phase 2, and phase 3 and, finally, the single sensor signal. In this case it will not be possible to get any idea about the position of the rotor from the sensor signal, as was possible in the three-sensor case. Still, in order to be able to bring the motor into controlled rotation, the ramp of the starting signal is allowed to operate the microprocessor to activate the windings of phase 1 while the rotor, with certainty, is driven so long as the rotor poles that are closest fully overlap the stator poles of phase 1. Then, depending on the desired direction of rotation, the microprocessor activates either phase 2 or phase 3. In the example phase 2 is activated at the same time as phase 1 is inactivated. Then, phase 3 is activated as soon as a negative flank appears in the sensor signal and at the same time phase 2 is inactivated. As appears in the diagram, the sensor signal is neglected during the first part of the start procedure. The sensor signal is accepted after the activation of phase 2 and then first when the signal by a negative flank indicates that the stator and rotor poles of phase 2 fully match. This control of the sensor signal is carried out by the microprocessor. When the sensor signal is accepted, phase 3 is activated and henceforth the sensor signal controls the activation and inactivation, respectively, of the different phases.

Figure 5:
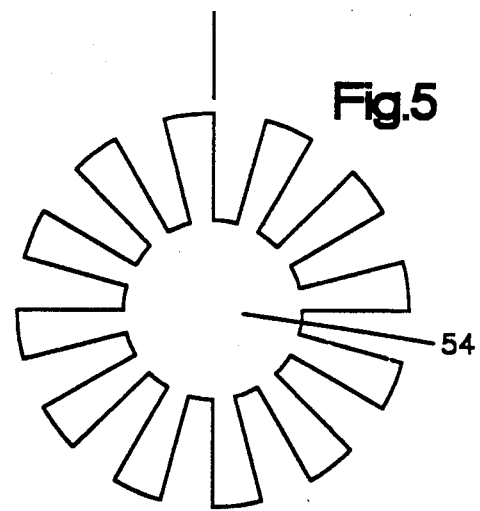

The diagram of FIG. 8 relates to a twelve-wing disc according to FIG. 5, which, as far as waveforms are concerned, has the same overall disposition as FIG. 7. The same start procedure is valid as in FIG. 7. By arrows in FIG. 7 as well as in FIG. 8, interrelated points have been indicated in which a flank in the sensor signal causes either activation or inactivation of a phase. Hence, the arrows traced at the far left in FIG. 7 show that a negative flank of the sensor signal causes the inactivation of phase 2 and the application of supply voltage to phase 3. The remaining arrows show that positive as well as negative flanks of the sensor signal operate the different phases. This means that the logic in the control device 26 has to be designed such that positive and negative flanks in the sensor signal can be identified. This will not be necessary in the embodiment of FIG. 5 wherein the sensor disc is provided with twelve wings. As appears from FIG. 8, twice as many pulses are generated by this sensor and, accordingly, only the negative flanks of the sensor signal need to be noted. Hereby, the logic in the control device 26 will be considerably simplified.

In certain applications, it is desirable that the motor be kept ready for the next start and then at the starting moment that it moves in the correct direction. One such application is in a washing machine in which the motor which drives the washing drum is intermittently started, stopped and reversed under the control of a program. Then a reluctance motor according to the invention can be so positioned that at the start of the machine the motor control device knows the position of the rotor and the start will take place immediately in the correct direction. In intermittent operation of the motor no new positioning will take place between consecutive startings but the control device will receive from the sensor device information about the actual position of the rotor.

In a modified embodiment, the control device can be designed such that when the motor is to be stopped one of the stator pole pairs is permanently connected to the DC source, causing a braking effect to develop, and, in addition, providing an automatic positioning for the next start. The same stator pole pair remains magnetized until the motor is to be started again.

Summarizing, the invention provides a control device for a reluctance motor which, by use of only one sensor, still operates the motor to start rotation in the desired one of the two possible directions of rotation.

We claim:

1. A reluctance motor comprising a stator (11) having three pairs of poles (1,1'; 2,2'; 3,3') provided with windings (14, 15) and a rotor (12) made from soft magnetic material and having four poles (13) which are disposed diametrically opposite each other in pairs, the windings (14,15) in each stator pole pair (1,1'; 2,2'; 3,3') being connectable to a DC source (18) under the control of a control device (26) responsive to a signal from a sensor device (20) which, during the movement of the rotor, is arranged to indicate the position of the rotor poles, characterized in that the sensor device (20) includes a sensor (21) which cooperates with a disc (23) rotating with the rotor, said disc having twelve wings equally distributed and each having the shape of a sector of a circle, the peripheral extension of which corresponds wit the corresponding extension of the gap between two wings, said sensor during one turn of the rotor (12) emitting to the control device (26) a train of rectangular pulses, said pulse train having at least as many pulses as correspond to the number of stator poles, the wings (22) of the disc (23) rotating with the rotor (12) being so disposed with respect to the rotor poles (13) that a flank in the pulse train appears when a rotor pole is about to turn in over a stator pole, said control device (26), at the start of the motor initially positioning said rotor with said sensor being disabled, said sensor then being enabled wherein said control device (26) in response thereto connects the stator pole pairs (1,1'; 2,2'; 3,3') to the Dc source (18) in the order corresponding to the desired direction of rotation of the rotor (12), said control device (26) being arranged during the course of positioning first to connect a predetermined one of the stator pole pairs (1,1'; 2,2'; 3,3') to the DC source (18) and thereafter to connect a predetermined one of the remaining stator pole pairs, the connecting time period for the respective pole pair being so long as to permit the completion of the transient period of the rotor movement.

2. A reluctance motor according to claim 1 characterized in that the control device (26) is arranged at intermittent operation to carry out positioning of the rotor only at the first start, the sensor device being arranged between consecutive startings to provide to the control device (26) information about the position of the rotor.

3. A reluctance motor according to either claim 1 or 2, characterized in that preferably in intermittent operation the control device (26) for the purpose of stopping the motor is arranged to permanently connect one of the stator pole pairs (1,1'; 2,2'; 3,3') to the DC source (18) and to have the connection remain until the next start of the motor.

* * * * *